United States Patent
Warren

(10) Patent No.: US 9,151,417 B2
(45) Date of Patent: Oct. 6, 2015

(54) METHOD AND COMPOSITION FOR LINING A PIPE

(71) Applicant: Danny Warren, Carver, MA (US)

(72) Inventor: Danny Warren, Carver, MA (US)

(73) Assignee: WARREN ENVIRONMENTAL, INC., Carver, MA (US)

( * ) Notice: Subject to any disclaimer, the term of this patent is extended or adjusted under 35 U.S.C. 154(b) by 0 days.

(21) Appl. No.: 14/044,471

(22) Filed: Oct. 2, 2013

(65) Prior Publication Data

US 2014/0034178 A1 Feb. 6, 2014

Related U.S. Application Data

(62) Division of application No. 12/388,256, filed on Feb. 18, 2009, now Pat. No. 8,591,695.

(60) Provisional application No. 61/036,639, filed on Mar. 14, 2008.

(51) Int. Cl.
*F16L 55/16* (2006.01)
*F16L 11/02* (2006.01)
*F16L 55/165* (2006.01)

(52) U.S. Cl.
CPC ............ *F16L 11/02* (2013.01); *F16L 55/1651* (2013.01); *F16L 55/1656* (2013.01); *Y10T 428/1362* (2015.01); *Y10T 428/1393* (2015.01)

(58) Field of Classification Search
USPC ..................... 138/97, 98; 405/150.1, 184.2
See application file for complete search history.

(56) References Cited

U.S. PATENT DOCUMENTS

| | | | |
|---|---|---|---|
| 4,009,063 A | 2/1977 | Wood | |
| 4,350,548 A | 9/1982 | Zenbayashi et al. | |
| 4,456,401 A | 6/1984 | Williams | |
| 4,478,282 A * | 10/1984 | Nolte et al. | 166/281 |
| 4,714,095 A | 12/1987 | Muller et al. | |
| 4,770,562 A | 9/1988 | Muller et al. | |
| 4,778,553 A | 10/1988 | Wood | |
| 4,836,715 A * | 6/1989 | Wood | 405/150.1 |
| 5,044,405 A | 9/1991 | Driver et al. | |
| 5,049,003 A | 9/1991 | Barton | |
| 5,108,533 A | 4/1992 | Long, Jr. et al. | |
| 5,280,811 A | 1/1994 | Catallo et al. | |
| 5,393,481 A | 2/1995 | Wood | |
| 5,409,561 A | 4/1995 | Wood | |
| 5,411,060 A * | 5/1995 | Chandler | 138/98 |
| 5,477,887 A | 12/1995 | Catallo | |

(Continued)

FOREIGN PATENT DOCUMENTS

WO 9708487 A1 3/1997
WO 9905085 A1 2/1999

*Primary Examiner* — James Hook
(74) *Attorney, Agent, or Firm* — Barlow, Josephs & Holmes, Ltd.

(57) ABSTRACT

A pipe lining composition and a method for installing the pipe lining composition into a pipeline requiring repair is provided. The lining composition is a layered lining composite formed of alternating plies of felt and carbon fiber strand reinforcing such that layers of carbon fiber reinforcing strands are trapped between layers of felt. Once the composite is laid up the composite is preferably stitched to provide stability and to maintain the layers relative to one another and then formed into a tube. In accordance with the method, the lining tube is then sequentially filled resins of increasing viscosity as it is drawn through rollers in a manner that fully wets out the carbon fiber before it is placed into the pipe to be lined.

11 Claims, 4 Drawing Sheets

(56) References Cited

U.S. PATENT DOCUMENTS

| | | |
|---|---|---|
| 5,495,922 A | 3/1996 | Booher |
| 5,653,555 A | 8/1997 | Catallo |
| 5,680,885 A | 10/1997 | Catallo |
| 5,706,861 A | 1/1998 | Wood et al. |
| RE35,944 E | 11/1998 | Driver et al. |
| 5,868,169 A | 2/1999 | Catallo |
| 5,876,645 A | 3/1999 | Johnson |
| 5,993,581 A | 11/1999 | Toyoda et al. |
| 6,001,212 A | 12/1999 | Polivka et al. |
| 6,117,507 A | 9/2000 | Smith |
| 6,354,330 B1 | 3/2002 | Wood |
| 6,539,979 B1 | 4/2003 | Driver |
| 6,703,091 B1 | 3/2004 | Walker |
| 6,708,729 B1* | 3/2004 | Smith ............... 138/98 |
| 6,837,273 B2* | 1/2005 | Woolstencroft et al. ........ 138/98 |
| 6,868,870 B2 | 3/2005 | Warren |
| 6,923,217 B2* | 8/2005 | Smith ............... 138/98 |
| 6,932,116 B2* | 8/2005 | Smith et al. ............... 138/98 |
| 7,096,890 B2* | 8/2006 | Woolstencroft et al. ........ 138/98 |
| 7,857,932 B1 | 12/2010 | Driver et al. |
| 8,591,695 B2* | 11/2013 | Warren ............... 156/294 |
| 2002/0058121 A1 | 5/2002 | Mercier |
| 2002/0124898 A1* | 9/2002 | Renaud et al. ............... 138/98 |
| 2005/0161100 A1* | 7/2005 | Pleydon et al. ............... 138/98 |
| 2006/0070676 A1* | 4/2006 | Blackmore, Jr. ............... 138/98 |
| 2006/0278290 A1 | 12/2006 | Warren |
| 2007/0113971 A1 | 5/2007 | Driver et al. |

\* cited by examiner

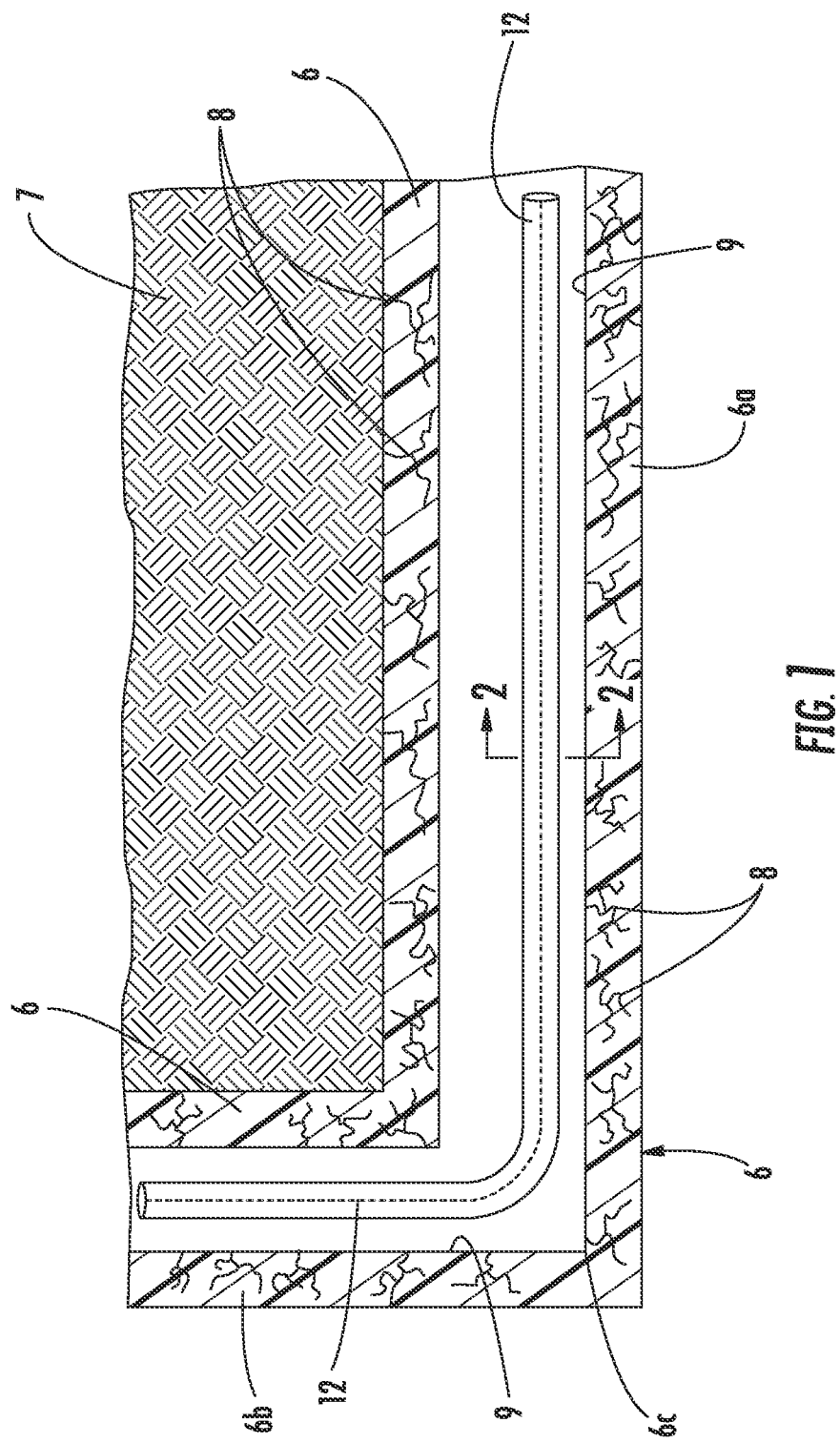

METHOD AND COMPOSITION FOR LINING A PIPE

CROSS-REFERENCE TO RELATED APPLICATIONS

This application is a divisional of U.S. patent application Ser. No. 12/388,256, filed Feb. 18, 2009 which is related to and claims priority from earlier filed U.S. Provisional Patent Application No. 61/036,639, filed Mar. 14, 2009.

BACKGROUND OF THE INVENTION

The present invention generally relates to a method and composition for use in repairing a pipeline, such as a sewer pipe, by installing a liner inside of the pipeline. More specifically, the invention involves the formation of a reinforced lining sleeve, the method of wetting out the fibers in the reinforcing sleeve and the installation of that lining sleeve on inside walls of the pipeline.

There are numerous pipeline conduits that run underground including water lines, sewer pipes, storm water drains, and the like. Over time such pipelines generally deteriorate due to ordinary aging, corrosive action of the fluids being transported in the line, exposure to unusual environmental conditions or for other reasons. As a result, these pipelines often must be repaired to fix holes, cracks and other defects that occur in the line. Despite the cause of the damage, it is important that such a damaged pipeline be mended in order to prevent fluid leakage problems. In some instances the problem may be the result of infiltration, where foreign matter leaks through the cracks and into the material being carried in the pipeline conduit. For example, rust, asbestos, and other substances may flow from the surrounding underground environment into the pipeline and contaminate drinking water. In other instances the problem is exfiltration, where the fluid that is being carried along the pipeline conduit flows outwardly through the cracks leading to a loss of water pressure and other problems.

There are various known methods for renovating existing underground pipelines. Many of these methods employ the installation of a lining hose via the use of a calibration hose. For example, U.S. Pat. No. 4,714,095 (Müller) discloses a method of salvaging an underground sewer pipe with a lining hose and a calibration hose. The lining hose includes an inner layer that is treated with a first resin and an outer layer that is not treated with a resin. The lining hose is placed into the pipe conduit. A calibrating hose, having an outer surface thereof coated with a resin, is introduced into the interior of the lining and expanded to bring the first and second resins into contact with one another while expanding the liner against the interior wall of the pipeline to be repaired. The resins then harden so that the lining hose becomes attached to contact surfaces of the pipeline wall and the calibration hose.

Similarly, U.S. Pat. No. 4,770,562 (Müller) discloses another method of salvaging an underground pipe conduit. A lining hose having an inner layer that is saturated with a resin and an outer layer that is perforated to form flow-through openings for the resin of the inner layer is introduced into the pipeline conduit. Then, the lining hose is shaped to conform to the interior surface of the pipeline by introducing an auxiliary hose into the lining hose and injecting fluid into the auxiliary hose. The resins harden to form a lining structure in the pipeline. After the curing step, the auxiliary hose can be kept in the lining hose or removed by ropes or cables.

U.S. Pat. No. 5,653,555 (Catallo) discloses a method of lining a pipe conduit using multiple curing resins. A lining hose that is coated with a high-strength resin is first positioned inside of the pipeline to be repaired. A calibration hose carrying a layer of corrosion-resistant resin is then inverted into the lining hose to expand the lining hose into contact with the inside surface of the pipeline. The high-strength and corrosion-resistant resin layers are then cured by the application of a heated fluid to the interior of the calibration hose. The cured lining hose and calibration hose form a rigid self-supporting structure on the interior of the pipeline.

In another Catallo reference, U.S. Pat. No. 5,680,885, a method of rehabilitating a damaged pipe conduit using a lining hose and calibration hose is disclosed. The inner layer of the lining hose is soaked with an excess volume of resin while a calibration hose installed therein contains a resin-absorbent layer. The calibration hose is installed by inverting it using pressurized heated water. After inversion, the resin-absorbent layer of the calibration hose contacts and adheres to the resin coated layer of the lining hose. Upon curing, the calibration hose becomes an integral part of the liner.

Finally, U.S. Pat. No. 5,706,861 (Wood) discloses a method of lining a section of a pipeline by a "cured in place" system using a lining tube and inflatable bladder. The lining tube is impregnated with a curable synthetic resin and is carried into the pipe conduit on an annular inflatable bladder. The bladder is inflated and the lining tube is cured to the pipeline. Then, the bladder is peeled away from the cured lining tube and removed from the pipe conduit by ropes.

Although the above-described conventional methods may be somewhat effective in repairing pipelines, they still suffer from various problems. For example, problems arise concerning the inversion of a felt liner because it is relatively delicate and tends to break or rip during the inversion process. While the use of reinforcement in the liner is desirable, due to the manner in which the liners are handled during installation, typical reinforcement fibers that are not fully wetted out have the tendency to break. Moreover, while carbon fiber is highly desirable as a reinforcing fiber, it is only effective in multiple plies and it is extremely difficult to properly wet out.

In view of the foregoing, there is a need for a pipe liner that effectively incorporates carbon fiber reinforcing. Further, there is a need for a pipe liner composition and method of installing that pipe liner composition that allows the use of multiple layers of carbon fiber reinforcing while ensuring the proper wet out of the carbon fiber prior to installation thereof. Finally, there is a need for a method of installation of a pipe liner that employs carbon fiber reinforcing that facilitates proper wet out of the fibers prior to installation thereby greatly reducing breakage of the fiber reinforcing due to the handling and installation thereof.

BRIEF SUMMARY OF THE INVENTION

In this regard, the present invention relates to a pipe lining composition and a method for installing the pipe lining composition into a pipeline, such as an underground water pipeline. The composition and installation method of the liner of the present invention enables a damaged pipeline to be repaired or salvaged thereby placing it back into condition for normal use.

The composition of the present invention is a layered lining composite formed of alternating plies of felt and carbon fiber strand reinforcing. It is preferred that the composite is formed using at least one bottom layer of felt, at least one inner layer of carbon fiber reinforcing strands and at least one top layer of felt thereby trapping the carbon fiber reinforcing strands between layers of felt. Further, it is preferred that the composite may be thicker by alternately adding additional layers of carbon fiber reinforcing strands and felt to increase the thickness of the composite using alternate layers. While additional plies may be built up of alternating felt and reinforcing fibers, it is preferred that the top and bottom layers of the composite be felt. Once the composite is laid up the composite is stitched to provide stability to the composite maintain the layers relative to one another. After stitching, the composite is formed into a tube in preparation of installing the liner tube as described in detail below. Heretofore, carbon fiber has not been used in such applications because in its native state it is very brittle and it is difficult to wet out sufficiently.

The lining tube is then filled with a thin resin and drawn through rollers in a manner that fully wets out the carbon fiber before it is placed into the pipe to be lined. While the initial wet out resin is of too low a viscosity to be used in a structural fashion, it easily wets out the carbon fiber. Subsequently thicker resins are added and drawn through additional rollers until the entire structure is wet out with the desired resin.

Therefore, it is an object of the present invention to provide a new and novel lining composite and installation process for lining the interior surface of a pipeline to repair and salvage the pipe so that is can be used normally in a leak-free condition. It is another object of the invention to provide a carbon fiber reinforced structural lining composite that effectively seals all cracks and faults in an existing pipeline. It is still a further object of the invention is to provide a structural lining composite that employs carbon fiber that is fully wetted out thereby greatly reducing the breakage that typically occurs during the installation process. Finally, it is an object of the invention is to provide a method and composite for use in the installation of a pipeline liner that improves the overall strength of the pipeline.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention:

FIG. 1 is a side cross-sectional view of a pipeline within the ground showing a collapsed liner composition placed in position in the pipeline in accordance with the method of the present invention;

DETAILED DESCRIPTION OF THE INVENTION

Figure 2A:
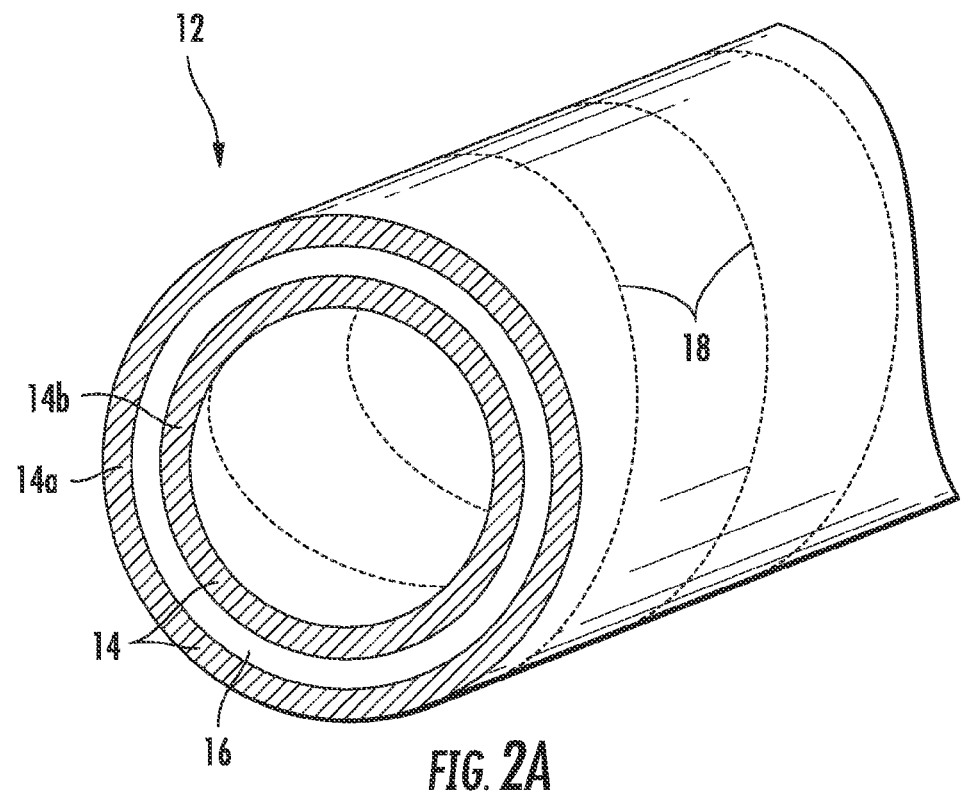
FIG. 2a is a cross-sectional view through the line 2-2 of FIG. 1 showing the layers of the liner composition.

Now referring to the drawings, the pipe lining composition and a method for installing the pipe lining composition of the present invention is shown and generally illustrated. The composition and installation method of the liner of the present invention enables a damaged pipeline to be repaired or salvaged thereby placing it back into condition for normal use.

The composition and method of the present invention is used to repair a damaged underground pipeline, such as a water line, so that it can be used in the normal course without undesirable leaks. As can be understood, cracks and leaks in a fluid line is undesirable to the associated pressure drops and flow inefficiencies. With a cracked pipeline, particles commonly break off from the inner surface of the pipeline thereby contaminating the fluid that flows through the pipeline.

Referring first to FIG. 1, a side cross-section view of a typical pipeline installation is shown. The pipeline or host pipe 6 is installed in the ground 7 where a number of cracks 8 exist representing undesirable leaks. The pipeline 6 includes a horizontal section 6a and a vertical section 6b. A common pipeline 6, as shown in FIG. 1, is typically made of concrete. Foreign matter, such as dirt, accumulates on the inner wall surfaces 9 over time. The debris (not shown) forms hard scale deposits on the wall surfaces, and these scales are difficult to remove. Also, degradation of the pipeline over time causes bits of the pipeline to break off which is exacerbated by cracks therein.

In accordance with the process of the present invention, the inside surface 9 of the pipeline 6, to be repaired, is preferably first prepared to remove the aforementioned debris and dirt to ensure a good bond, as will be described in detail below. Preferably, the inner wall surfaces 9 of pipeline 6 are cleaned by injecting highly pressurized water into the pipeline. The pressurized water stream strikes the inside walls forcefully and scrubs the walls. For example, the water is provided at up 30,000 psi to ensure a clean surface. Even higher pressure can be used, if necessary. Known water spraying devices are used for this step of the process. The injected water substantially removes the foreign debris to leave a clean inner wall surface 9 remaining. While high-pressure water is preferably used, air or steam may be used instead. Also, additional cleaning agents are not preferably used but such cleaning agents could be added to the water, air or steam to assist in cleaning depending the application and environment.

After surface cleaning is complete, any standing water left remaining, such as that on the bottom of the pipeline 6, must now be removed. High pressure air, using known air blowing equipment, is injected into the pipeline to clear it of any remaining cleaning media. In this manner the pipeline 6 is fully prepared and ready to receive a liner as is described in detail below.

Figure 2B:
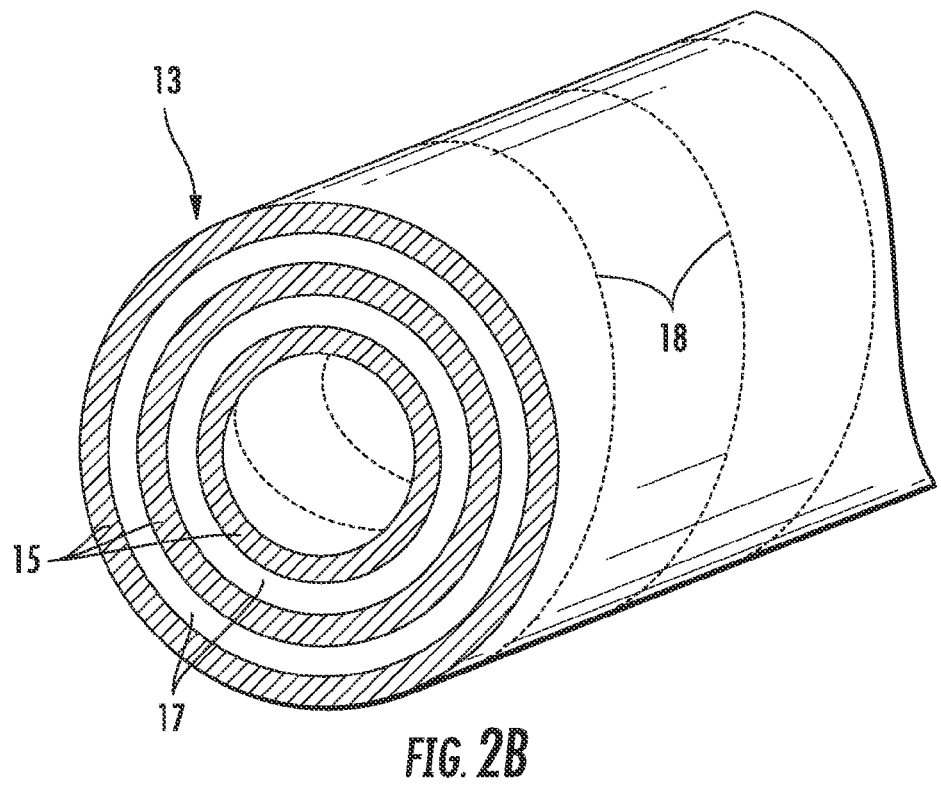
FIG. 2b is a cross-sectional view through the line 2-2 of FIG. 1 showing an alternate arrangement of the layers of the liner composition.

Turning to FIG. 2a, the liner composition 12 of the present invention can be seen to be a layered lining composite formed of alternating plies of felt 14 and carbon fiber strand reinforcing 16. It is preferred that the liner composition 12 is formed using at least one bottom layer of felt 14a, at least one inner layer of carbon fiber reinforcing strands 16 and at least one top layer of felt 14b thereby trapping the carbon fiber reinforcing strands 16 between layers of felt 14. While the term felt is used herein, the felt layer is preferably any suitable layer of non-woven fibrous material. Felt is preferable in that it is a commonly available material that is suitable as a resin-absorbing material. More particularly, polyester-needled felt materials can be used as these felt materials have good resin-absorbency properties. Further, as can be seen in FIG. 2b, if it is preferred that the liner composition 13 may be thicker as by alternately adding additional layers of carbon fiber reinforcing strands 17 and felt 15 to increase the thickness of the liner composition 12 using alternating layers. While additional plies may be built up of alternating felt 15 and reinforcing fibers 17, it is preferred that the top and bottom layers of the liner composition 12 be felt. Once the liner composition 12 is laid up, although not required, it is preferable the liner composition 12 is stitched 18 to provide stability to the liner composition 12 and maintain the layers in position relative to one another. After stitching 18, the liner composition 12 is formed into a tube in preparation of installing the liner composition 12 in the form of a tube as described in detail below. Heretofore, carbon fiber has not been used in such applications because in its native state it is very brittle and it is difficult to wet out sufficiently.

Figure 3:
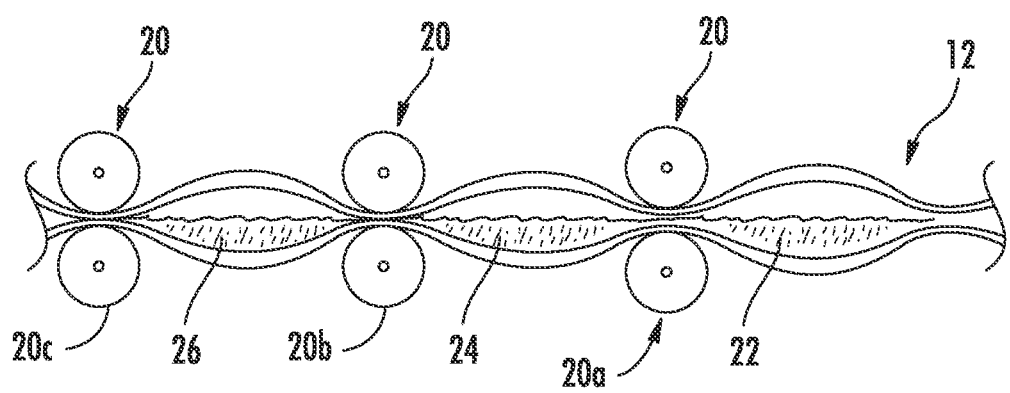
FIG. 3 is a schematic view of the process of wetting out the liner composition in accordance with the method of the present invention.

Turning to FIG. 3, the liner composition 12 can be seen as it is prepared for installation in accordance with the method of the present invention. To overcome the limitation of the breakage of carbon fiber, in accordance with the method of the present invention, after the above steps related to the formation of the liner composition 12, the liner composition 12 is then prepared for installation into the piping by wetting it out with resin. In this process, the leading end of the liner composition 12 is placed into a press consisting of at least two and more preferably at least three sets of spaced apart press rollers 20. A thin resin material 22 is injected into the interior of the liner composition 12 behind the first set of rollers 20a and a heavier resin 24, 26 is injected into the liner composition 12 behind each of the subsequent sets of rollers 20b, 20c. As the liner composition 12 is first drawn through the rollers 20a, the thin resin 22 is urged through the layers of felt and carbon fiber initially wetting out the layers then the second 20b and third rollers 20c urge the thicker resin 24, 26 into the layered construction of the liner composition 12 effectively wetting out the entire structure with the desired resin having the desired consistency. While the first resin 22 may be too thin for the desired lining process, it serves as an initial agent in starting the wetting out process that allows subsequent wet out by the thicker resins. Once the carbon fiber is fully wetted out in the process described above it can be easily installed into the pipeline to be lined without risking the breakage of the carbon fiber reinforcing.

In terms of resins, many different types of curable resins can be used for wetting out the liner. While any curable resin may be employed, preferably such a resin will be a thermosetting resin. The resin is preferably a 100% solid, slow cure, NSF-approved epoxy but also may be an NSF-approved flexible epoxy. The thermosetting resin should have good adhesive strength and have high strength (for example, high flex modulus, flex strength, tensile modulus, and tensile strength properties.) Similarly, slow-curing resins may be used. For example, polyesters; vinyl esters such as urethane-based vinyl esters, and bisphenol A-fumarate based vinyl esters; and epoxy resins can be used. Epoxy resins are particularly preferred.

Figure 4:
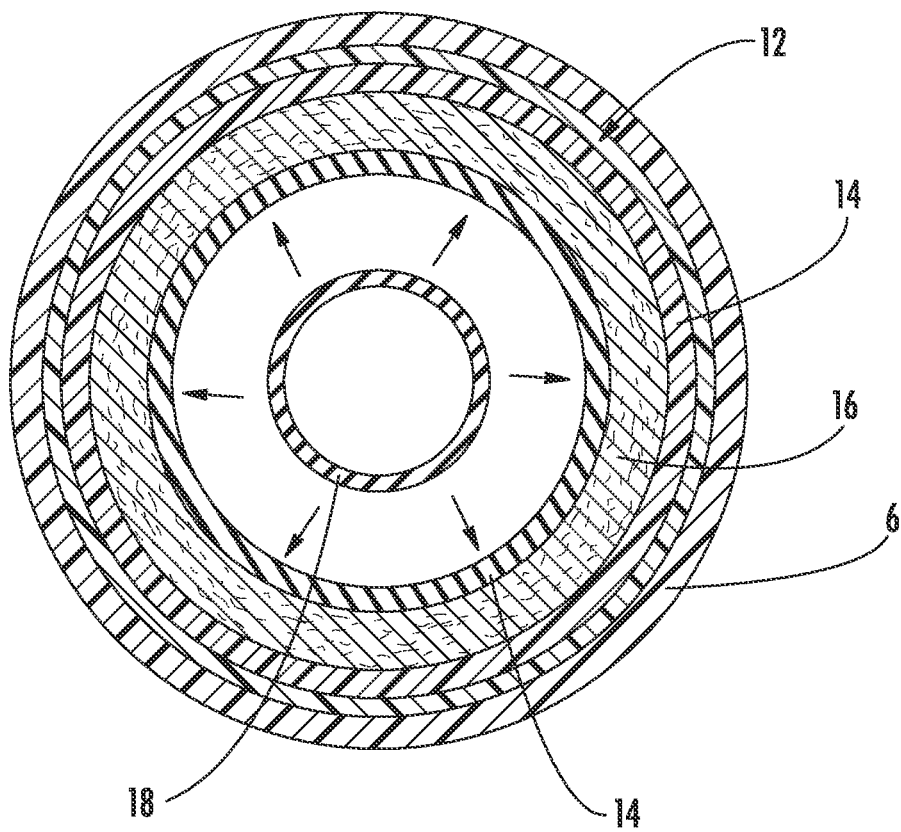
FIG. 4 is a cross-sectional view showing the step of the calibration hose pressing the liner composition into communication with the inner wall of the pipeline.

As described above relating to FIG. 1 and as is shown in FIG. 4, the wetted out liner composition 12 is then inverted into the pipeline 6 by introducing a calibration hose into the resin-saturated liner composition 12 using techniques known in the industry. The calibration hose can be made from materials such as polyvinyl chloride, polyurethane, polyethylene, polypropylene, polyesters, polyamides, or the like. The calibration hose is not treated with a curing resin in the method of this invention. Most importantly, the calibration hose does not adhere to the interior of the liner composition 12. The calibration hose is filled with a pressurized fluid such as for example water, air or steam. The inverted calibration hose 18 walks along the inside of the lining hose 12 and expands and presses its against the inner wall 9 of the pipeline 6.

The use of pressurized water (not shown) to invert the calibration hose 18 has several benefits. Particularly, the calibration hose 18 is filled with water gradually so that the calibration hose 18 walks-through the pipeline 6. As the calibration hose 18 is fed into the liner composition 12, it can easily travel, as shown in FIG. 1, from a vertical pipeline section 6b to a horizontal pipeline section 6a and vice versa. The pressurized water makes the inverted calibration hose 18 push against the flexible liner composition 12 and forces the liner composition 12 outwardly so that it presses against and engages the interior walls 9 of the pipeline 6. As a result, the liner composition 12 contacts and conforms to the shape of the internal pipeline walls 9.

The water injected into the calibration hose 18 is heated to substantially cure and harden the thermosetting resin. Preferably, the water is heated to a temperature of at least 100° F. and more preferably to a temperature of about 130° F. The temperatures can vary depending on the resin selected for use. The curing reaction is exothermic so the curing of the resin, itself, generates heat that improves the curing rate. Also, the resin may contain heat-initiated curing agents that accelerate the curing process. Upon the curing and hardening of the resin, the liner composition 12 becomes attached to the wall surfaces 9 inside of the pipeline 6. Preferably, the calibration hose 18 remains in place for 4-36 hours depending on the epoxies used, the environmental temperature and the temperature of the water introduced into the calibration hose 18 for curing.

The calibration hose 18 can then be removed from the liner composition 12 using techniques known in the art. Typically, a rope or cable is attached to the trailing end of the calibration hose 18. An operator pulls on the rope or cable to remove the calibration hose 18 from the liner composition 12. The resulting composite structure includes a rigid lining hose firmly attached to the pipeline with a rugged, smooth and leak-free sealing inner surface of epoxy material and a highly reinforced carbon fiber shell.

It can therefore be seen that the present invention provides a highly reinforced liner composition and method of installing the liner composition that has not been seen or employed in the prior art. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A lining hose for lining an interior surface of an underground pipeline comprising:
    an interior layer of non-woven fibrous material;
    at least one carbon fiber reinforcing layer;
    exterior layer of non-woven fibrous material;
    a first low viscosity resin initially wetting out said lining hose; and
    a second resin having a higher viscosity fully wetting out said lining hose.

2. The lining hose of claim 1, wherein the reinforcing layer further comprises:
    alternating plies of reinforcing layers and non-woven fibrous material layers.

3. The lining hose of claim 2, wherein the reinforcing layers, the interior layer and the exterior layer are stitched together.

4. The lining hose of claim 1, wherein the non-woven fibrous material is a polyester-needled felt.

5. The lining hose of claim 1, wherein the at least one reinforcing layer, the interior layer and the exterior layer are stitched together.

6. The lining hose of claim 1, wherein the lining hose includes an interior layer and an exterior layer of non-woven fibrous material.

7. The lining hose of claim 6, wherein the non-woven fibrous material is a polyester-needled felt.

8. The lining hose of claim 6, wherein the lining hose includes a layer of carbon fiber reinforcing between said interior layer and said exterior layer.

9. The lining hose of claim 8, wherein the reinforcing layer, the interior layer and the exterior layer are stitched together.

10. The lining hose of claim 6, wherein the lining hose includes an interior layer of non-woven fibrous material and alternating plies of carbon fiber reinforcing and non-woven fibrous material.

11. The lining hose of claim 10, wherein the reinforcing plies, the interior layer and the non-woven fibrous material plies are stitched together.

\* \* \* \* \*